United States Patent Office 2,967,880
Patented Jan. 10, 1961

---

2,967,880

CARBAMIC ACID GLYCOL ESTERS

Otto Finke, Karl Zeile, and Herbert Köppe, all of Ingelheim (Rhine), Germany, assignors to C. H. Boehringer Sohn, Ingelheim (Rhine), Germany, a partnership No Drawing. Filed Oct. 16, 1958, Ser. No. 767,523

Claims priority, application Germany Oct. 21, 1957

17 Claims. (Cl. 260—482)

This invention relates to carbamic acid glycol esters, and more particularly to compounds having the general structural formula

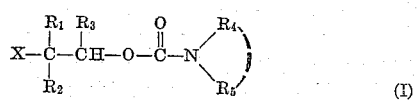

wherein X is hydroxyl, chlorine or bromine; $R_1$ and $R_2$, which may be identical to or different from each other, are aryl, substituted aryl, alkyl, alkenyl, alkinyl, cycloalkyl or aralkyl; $R_3$ is alkyl with 1 to 3 carbon atoms; $R_4$ is hydrogen, alkyl, aryl, or carbamyl; and $R_5$ is hydrogen or alkyl; $R_4$ and $R_5$ may also, as indicated by the dotted line, be members of a heterocyclic ring which includes the nitrogen atom, such as a piperidyl, morpholyl, or pyrrolidyl ring. These definitions of X, $R_1$, $R_2$, $R_3$, $R_4$ and $R_5$ shall apply throughout the present specification.

Compounds having the above structural Formula I may be prepared by methods involving well-known chemical reaction principles, and using as starting materials substituted glycols having the structural formula

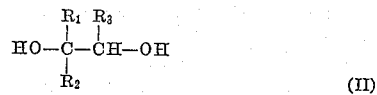

More particularly, the following methods have been found to be particularly advantageous in preparing compounds having the structural Formula I above.

METHOD A

By reaction of a substituted glycol with a carbamic acid halide:

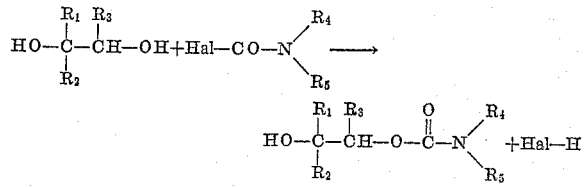

This reaction produces different reaction products, depending upon whether the carbamic acid halide is N-substituted or not, and also upon the type of solvent employed if the carbamic acid halide is N-unsubstituted. Thus, if an unsubstituted carbamic acid chloride ($R_4$ and $R_5$ are hydrogen) is used as one of the reactants, and the reaction is carried out at a temperature between $-10°$ C. and room temperature and in the presence of an agent capable of tying up the hydrogen halide being split off, either the carbamate or an allophanate is formed, depending upon the solvent employed. For example, while the monocarbamate is formed by the reaction of 1,1-diphenyl propane-1,2-diol, with an N-unsubstituted carbamic acid halide in the presence of ethylene chloride as a solvent, the corresponding allophanate is formed by the same reactants in the presence of benzene or ether as a solvent. This difference can be explained by the fact that urea chloride is relatively stable in ethylene chloride and reacts in this form, whereas in benzene or ether it rapidly condenses to form allophanic acid chloride and therefore forms allophanates with the glycol.

However, if the starting material is an N-substituted carbamic acid halide, carbamates are formed regardless of what the nature of the solvent medium is. Examples of solvents which are operative for this purpose are benzene, ether, toluene or ethylene chloride. The reaction temperature may range up to the boiling point of the particular solvent employed.

Examples of agents capable of tying up the hydrogen halide split off during the reaction are dimethyl aniline, pyridine and calcium carbonate.

METHOD B

By reaction of a substituted glycol with an isocyanate.

This method is particularly well suited for the preparation of those compounds having the structural Formula I in which $R_5$ is hydrogen. The reaction proceeds according to the following equation:

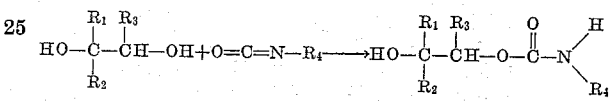

If the molar ratio of the reactants is 1:1, only the secondary hydroxyl group reacts and N-mono-substituted carbamates are formed. This reaction is advantageously carried out in an inert solvent, such as dioxan.

Only if the isocyanate is present in large excess with respect to the glycol reactant can the tertiary hydroxyl group also enter into the reaction under these conditions, so that no difficulties are encountered in avoiding this undesirable side reaction.

METHOD C

By reaction of a substituted glycol with a halogen-substituted formic acid ester and an amine.

This reaction proceeds through a carbonic acid ester intermediate which does not need to be isolated, however; it may be represented by the following equation:

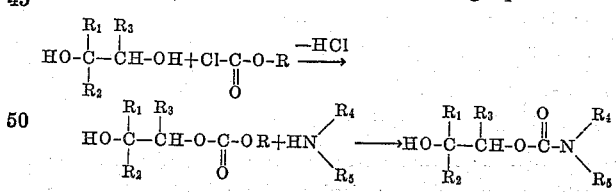

In this equation R may be alkyl or aryl.

Most advantageously, the substituted glycol is reacted with the halogen-substituted formic acid ester in the cold and in the presence of an agent capable of tying up the hydrogen halide being split off, such as a tertiary amine, and in the presence of an inert solvent. The reaction product is subsequently transformed into the desired carbamates with the aid of anhydrous ammonia, primary amines or secondary amines. This method has been found to be particularly advantageous in those cases where $R_1$ and $R_2$ are aryl or substituted aryl.

METHOD D

By reaction of a substituted glycol with phosgene and ammonia, or an amine.

This reaction proceeds through a cyclic diol carbonate intermediate which can be transformed into the desired carbamate with the aid of ammonia, primary amines or secondary amines; it may be represented by the following equation:

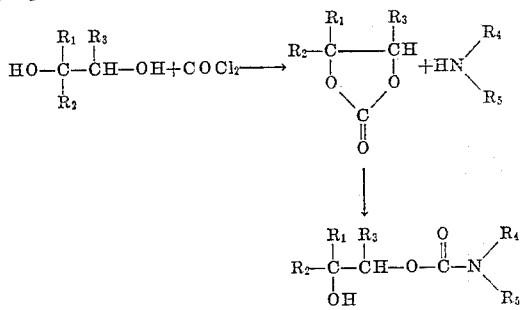

The reaction with phosgene is carried out in an inert solvent, and preferably in the presence of an agent capable of tying up the hydrogen chloride split off during the reaction, such as a tertiary amine, accompanied by cooling. The cyclic carbonate can be readily isolated in pure form; it is then reacted at room temperature or at an elevated temperature with ammonia, a primary amine or a secondary amine. The yield of end product is favored by employing an excess of the amine.

If it is desired to produce carbamates in which X in Formula I above is halogen, particularly chlorine or bromine, the tertiary hydroxyl group may subsequently be replaced by halogen according to known methods, for example by reaction with a thionyl halide.

The carbamic acid glycol esters according to the present invention contain at least one asymmetrically substituted carbon atom and therefore occur in the form of optical antipodes. The optically active forms may be produced by separation from the racemic end product or its preliminary forms; however, the use of optically active glycols, for example those obtained from optically active lactic acid, has been found to be particularly advantageous.

The novel carbamic acid esters exhibit valuable pharmacological and therapeutic properties; more particularly, they are useful as tranquilizers or ataractic agents. In addition, it has been found that in some cases the optically active form, which is structurally derived from levo-α-hydroxy acids, exhibits an increased activity over the racemate.

The following examples will further illustrate the present invention and enable others skilled in the art to understand the invention more completely. It should be emphasized, however, that the examples are merely illustrative of the broad concept of the invention and are not intended as delineating the confines of the scope of the invention.

EXAMPLE I

*Preparation of a substituted glycol from α-hydroxy acid esters or estolides, particularly from lactic acid esters and lactides*

(1) LEVO-1,1-DIPHENYLPROPANE-1,2-DIOL BY GRIGNARD REACTION OF LEVO-LACTIC ACID ETHYL ESTER 122 gm. (5 gm.-atoms) magnesium filings were covered with 200 cc. of a mixture of tetrahydrofuran and benzene (60:40). The reaction of this Grignard mixture was initiated with 5 cc. bromobenzene and a trace of iodine and was thereafter maintained by simultaneously adding dropwise chlorobenzene and additional tetrahydrofuran-benzene solvent mixture. The internal temperature of the reaction mixture rose to the boiling point. The mixture was continuously thoroughly stirred.

After allowing the reaction mixture to cool somewhat, a solution of 177 gm. (5 mols) lactic acid ethyl ester in 200 cc. of a tetrahydrofuran-benzene mixture (60:40) was added dropwise while further cooling and stirring the Grignard mixture. When all of the lactic acid ester had been added, the reaction mixture was boiled for 30 minutes. Thereafter, the entire reaction mixture was cooled and poured over 600–800 gm. ice. The cold mixture was then acidified with semi-concentrated hydrochloric acid, whereby an aqueous and non-aqueous phase were formed. The aqueous phase was separated and extracted with 500 cc. of the tetrahydrofuran-benzene solvent mixture. The acidified non-aqueous phase and the solvent extract from the extraction of the aqueous phase were combined and concentrated by evaporation until a yellow, oily residue was obtained. Upon cooling, this residue solidified in crystalline form and was dissolved in 200 cc. benzene. The resulting solution was admixed with petroleum ether until it became turbid. The crystals which separated out were filtered off on a vacuum filter and were dried. By evaporating the filtrate, a small additional quantity of crystals was obtained. The total yield of crystalline substance was 267 gm. (78% of theory). It had a melting point of 89–92° C.

The crystalline product was then subjected to a second recrystallization procedure as follows: It was dissolved in a mixture of 550 cc. methanol and 150 cc. water. The solution was heated and, while still hot, was filtered. Water was added to the filtrate until it became slightly turbid. Upon cooling, a colorless crystalline substance separated out, which was filtered off by vacuum filtration and dried. It was identified as levo-1,1-diphenylpropane-1,2-diol having a melting point of 92–94° C. and an optical rotation value $[\alpha]_D^{20} = -148°$ in benzene. The yield was 226 gm. (66% of the theoretical yield).

(2) LEVO-1,1-DIPHENYLPROPANE-1,2-DIOL BY GRIGNARD REACTION OF LEVO-LACTIDE

The Grignard reaction component was prepared in the manner described under A above, namely from 122 gm. (5 gm.-atoms) magnesium filings and 565 gm. (5 mols) chlorobenzene in a mixture of tetrahydrofuran and benzene. 144 gm. (1 mol) levo-lactide ($[\alpha]_D^{20} = -300°$) were dissolved in 350 cc. tetrahydrofuran and the resulting solution was added dropwise to the Grignard mixture, accompanied by stirring. After all of the lactide solution had been added the reaction mixture was boiled for 30 minutes and was then worked up as described under A. Recrystallization from a mixture of benzene and petroleum ether yielded 338 gm. levo- 1,1-diphenylpropane-1,2-diol (74% of theory) having a melting point of 89–91.5° C.

A second recrystallization from a methanol-water mixture yielded 283 gm. of the substituted propyl glycol (62% of theory) having a melting point of 92–94.5° C. and an optical rotation $[\alpha]_D^{20} = -150°$ in benzene.

*Preparation of carbamic acid glycol esters by reaction of a substituted glycol with a carbamic acid halide according to Method A*

EXAMPLE II

LEVO-1,1-DIPHENYLPROPANE-1,2-DIOL-2-CARBAMATE

A solution of 32 gm. (0.4 mol) carbamic acid chloride in 100 cc. ethylene chloride was admixed with 40 gm. (0.4 mol) finely powdered calcium carbonate at −5° C. Thereafter, while stirring and maintaining the mixture at −5° C., a solution 22.8 gm. (0.1 mol) levo-1,1-diphenylpropane-1,2-diol in 70 cc. ethylene chloride was added dropwise thereto. The resulting reaction mixture was then refluxed for one hour and allowed to cool, whereupon it was filtered on a vacuum filter. The filter cake was dried and suspended in a small amount of water and the suspension was acidified with semi-concentrated hydrochloric acid. The filtrate was distilled to drive off the ethylene chloride. The distillation residue was combined with the solid insoluble components of the acidified aqueous suspension of the filter cake which were separated from the aqueous phase by filtration. The solid raw product thus obtained was recrystallized twice from aqueous methanol, yielding 15 gm. of a colorless crystalline substance having a melting point of 154–156°

C., which was identified to be levo-1,1-diphenylpropane-1,2-diol-2-carbamate of the formula

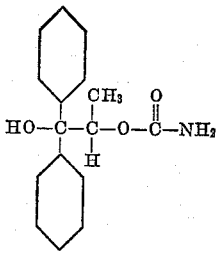

EXAMPLE III

LEVO-1,1-DIPHENYLPROPANE-1,2-DIOL-2-(N,N-DIETHYL)-CARBAMATE 22.8 gm. (0.1 mol) levo-1,1-diphenyl propane-1,2-diol were dissolved in 120 cc. warm pyridine, 27.0 gm. (0.2 mol) N,N-diethyl-carbamic acid chloride were added dropwise to this solution, accompanied by stirring and reflux cooling. The resulting reaction mixture was refluxed for five hours and was then allowed to cool, whereupon it was poured into 500 cc. water. The reaction product separated out in the form of a syrupy substance. The aqueous phase was decanted, and the syrupy residue was digested with dilute hydrochloric acid. The aqueous phase was again decanted, and the syrupy residue was recrystallized from aqueous methanol. The yield was 16 gm. of a colorless crystalline substance having a melting point of 126–127° C., which was identified to be levo-1,1-diphenylpropane-1,2-diol-2-(N,N-diethyl)-carbaminate of the formula

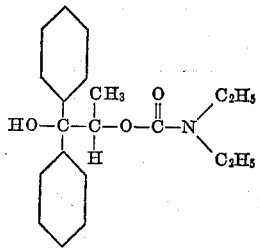

EXAMPLE IV

LEVO-1,1-DIPHENYLPROPANE-1,2-DIOL-2-ALLOPHANATE 80 gm. (1 mol) carbamic acid chloride were dissolved in 400 cc. ether, and the resulting solution was cooled to −5° C. 200 gm. (2 mols) powdered calcium carbonate were suspended in the cold solution. Thereafter, a solution of 57 gm. (0.25 mol) levo-1,1-diphenylpropane-1,2-diol in 200 cc. ether was added dropwise to the suspension over a period of about 45 minutes at a temperature between −5 and 0° C. The resulting reaction mixture was then heated to room temperature and was subsequently refluxed for four hours. In order to allow the reaction to go to completion as much as possible, the reaction mixture was stirred at room temperature overnight (15 hours). The reaction suspension was then filtered on a vacuum filter and the filter cake was dried. The dry solids thus obtained were taken up in 200 cc. semi-concentrated hydrochloric acid, the mixture was filtered on a vacuum filter and the filter cake was washed with water until neutral and dried over $P_2O_5$. The yield of raw reaction product was 90 gm. The raw product, a colorless solid substance, was combined with the solid residue obtained by evaporating the filtrate from filtration of the reaction suspension, and the combined solids were recrystallized from 350 cc. benzene. The yield was 68.0 gm. of a substance having a melting point of 173–175° C. The product was identified to be levo-1,1-diphenylpropane-1,2-diol-2-allophanate of the formula

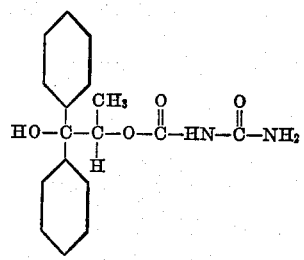

*Preparation of carbamic acid glycol esters by reaction of a substituted glycol with isocyanic acid or an isocyanate according to Method B*

EXAMPLE V

LEVO-1,1-DIPHENYLPROPANE-1,2-DIOL-2-ALLOPHANATE

Dehydrated cyanuric acid was thermally split into isocyanic acid in a heated tube which was maintained at about 400° C. by means of an electric heater. The isocyanic acid gas was flushed from the tube with the aid of a stream of $CO_2$ into a solution of 22.8 gm. (0.1 mol) levo-1,1-diphenylpropane-1,2-diol in 100 cc. dioxan. If the rate of feed of isocyanic acid is sufficiently rapid, the reaction goes to completion in about an hour. The dioxan solution was then filtered over charcoal and the filtrate was concentrated a little by evaporation. Water was then added to the solution until it became slightly turbid. The crystals which subsequently separated out were filtered off by vacuum filtration (20 gm.) and were recrystallized twice from benzene. The yield was 16.0 gm. of a substance having a melting point of 172–174° C. The product was identified to be levo-1,1-diphenylpropane-1,2-diol-2-allophanate of the formula

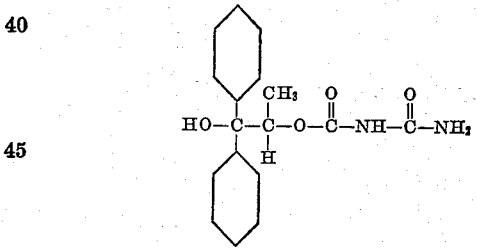

EXAMPLE VI

LEVO-1,1-DIPHENYLPROPANE 1,2-DIOL-2-(N-ETHYL)-CARBAMATE 22.8 gm. (0.1 mol) levo-1,1-diphenylpropane-1,2-diol were dissolved in 80 cc. benzene, and 14.2 gm. (0.2 mol) ethylisocyanate were added thereto. The resulting reaction mixture was heated for twelve hours at 90° C., accompanied by stirring and reflux cooling. Thereafter, the benzene solvent was distilled off in vacuo, and the residue was digested with petroleum ether. The raw reaction product, a viscous mass, was recrystallized from aqueous methanol. The yield of purified product was 12 gm. It had a melting point of 92–96° C. and the formula

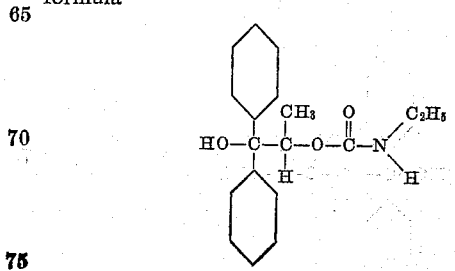

EXAMPLE VII

LEVO-1,1-DIPHENYLPROPANE-1,2-DIOL-2-(N-PHENYL)-CARBAMATE 22.8 gm. (0.1 mol) levo-1,1-diphenylpropane-1,2-diol were dissolved in 90 cc. benzene, and 23.8 gm. (0.2 mol) phenylisocyanate were added thereto. The resulting reaction mixture was refluxed for 15 hours at about 90° C., accompanied by stirring. Thereafter, the reaction solution was concentrated a little by evaporation and was allowed to cool. The crystalline substance which separated out thereby was filtered off on a vacuum filter, and the filter cake was washed with petroleum ether and recrystallized from benzene. The yield of purified product was 17.2 gm. It had a melting point of 159–161° C. and was identified to have the structural formula

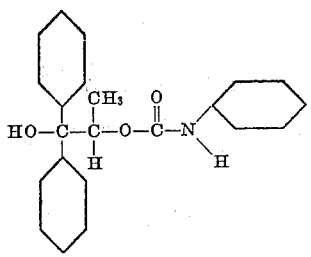

*Preparation of carbamic acid glycol esters by reaction of a substituted glycol with a halogenated formic acid ester and a base, according to Method C*

EXAMPLE VIII

LEVO-1,1-DIPHENYLPROPANE-1,2-DIOL-2-CARBAMATE 22.8 gm. (0.1 mol) levo-1,1-diphenylpropane-1,2-diol were dissolved in 80 cc. pyridine. Thereafter, 31.2 gm. (0.2 mol) chloroformic acid phenyl ester were added dropwise to the solution, accompanied by stirring and cooling the mixture so that the temperature did not rise above 30° C. After all of the chloroformic acid ester had been added, the reaction mixture was stirred for four hours at room temperature and poured into 200 cc. water, accompanied by stirring. The aqueous mixture was then extracted three times with 100 ml. portions and twice with 50 ml. of ether. The ether extracts were combined, and the resulting ether solution was shaken once with 100 cc. and once with 50 cc. semi-concentrated hydrochloric acid. Thereafter, it was washed with 200 cc. of an aqueous sodium bicarbonate solution and with 200 cc. of a concentrated aqueous sodium chloride solution. Subsequently, the ether solution was dried with magnesium sulfate, concentrated to about 100 cc., cooled to —45° C. and admixed with 250 cc. liquid ammonia. After the ammonia had evaporated and 100 cc. ether had been added to the residue, the ether solution was poured into 200 cc. water and shaken. The aqueous phase was decanted and extracted three times with 75 cc. portions of ether. The ether extracts were combined, shaken twice with 100 cc. portions of 1N NaOH, washed with 100 cc. of a concentrated aqueous NaCl solution and dried over magnesium sulfate. Thereafter, the ether was distilled off and the solid distillation residue was recrystallized from aqueous methanol. The yield was 15.5 gm. of a substance having a melting point of 156–158° C. The product was identified to be levo-1,1-diphenylpropane-1,2-diol-2-carbamate of the formula

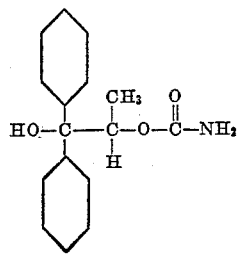

*Preparation of carbamic acid glycol esters by reaction of a substituted glycol with phosgene and a base, according to method D*

EXAMPLE IX

LEVO-1,1-DIPROPYLPROPANE-1,2-DIOL-CARBONATE 40 gm. (0.4 mol) phosgene were dissolved in 100 cc. benzene. Thereafter, a solution of 48 gm. (0.3 mol) levo-1,1-dipropylpropane-1,2-diol and 72 gm. (0.6 mol) dimethylaniline in 100 cc. benzene was added dropwise to the phosgene solution, accompanied by stirring and cooling so that the temperature did not rise above 10° C. After all of the glycol-dimethylaniline solution had been added, stirring was continued for two hours at room temperature. Subsequently, air was blown through the reaction mixture in order to remove excess phosgene. Small amounts of unreacted dimethylaniline were removed by shaking with 2 N hydrochloric acid. The reaction mass was then neutralized with an aqueous sodium bicarbonate solution and washed with water. The benzene solvent was then evaporated until an oily residue remained. This residue was fractionated under reduced pressure. The yield was 41 gm. of a substance having a boiling point of 88–92° C. at 0.15 mm. Hg and the formula

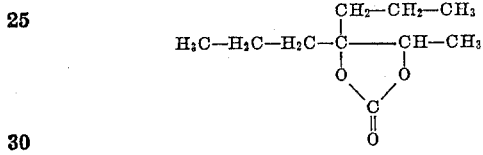

This intermediate compound was then transformed into a corresponding carbamate of the formula

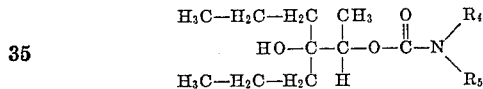

by the methods described in Examples X and XI below.

EXAMPLE X (a) LEVO-1,1-DIPHENYLPROPANE-1,2-DIOL-CARBONATE 45.6 gm. (0.2 mol) levo-1,1-diphenylpropane-1,2-diol and 48.4 gm. (0.4 mol) dimethylaniline, dissolved in 80 cc. benzene, were slowly introduced into a solution of 22 gm. (0.22 mol) phosgene in 80 cc. benzene, accompanied by stirring and cooling so that the temperature of the mixture did not rise above +10° C. Cooling was discontinued after all of the glycol-dimethyl aniline solution had been added. The resulting reaction mixture was then stirred for three hours at room temperature; and at the end of this period air was blown therethrough until all excess phosgene was completely removed. Small quantities of free dimethylaniline remaining in the reaction mixture were removed by shaking it with a small amount of 2N hydrochloric acid. The reaction solution was then neutralized with an aqueous sodium bicarbonate solution and was evaporated until a residue weighing about 50 gm. remained. This residue solidified into a crystalline substance upon cooling. It was recrystallized from 100 cc. aqueous methanol, yielding 44 gm. (86.5% of theory) of a crystalline substance having a melting point of 88–90° C. By recrystallizing again from 80 cc. aqueous methanol, 42.6 gm. (84% of theory) of the pure product, having a melting point of 89–91° C., were obtained. The reaction product was found to be levo-1,1-diphenylpropane-1,2-diol-carbonate of the formula

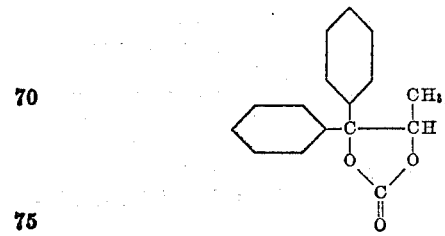

(b) LEVO-1,1-DIPHENYLPROPANE-1,2-DIOL-CARBAMATE 25.4 gm. (0.1 mol) levo-1,1-diphenylpropane-1,2-diol-carbonate were dissolved in 70 cc. warm ethanol, and 20 cc. concentrated aqueous ammonia were added to the solution. Thereafter, water was added to the mixture until it began to become turbid, whereupon the resulting reaction mixture was heated for three hours at 50° C. Subsequently, water was again added to the reaction mixture until it became turbid. It was then allowed to cool. A crystalline precipitate soon formed, which was separated by vacuum filtration. The filter cake was washed until neutral and recrystallized from aqueous methanol. The yield was 24.5 gm. of a substance having a melting point of 155–157° C. The reaction product was identified to be levo-1,1-diphenyl-propane-1,2-diol-carbamate of the formula

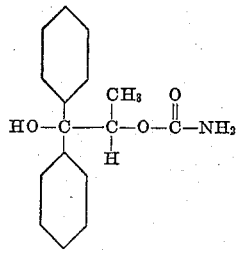

EXAMPLE XI (a) LEVO-1,1-DIPHENYLPROPANE-1,2-DIOL-2-(N-METHYL)-CARBAMATE 25.4 gm. (0.1 mol) levo-1,1-diphenylpropane-1,2-diol-carbonate were dissolved in 50 cc. warm ethanol. The resulting solution was warmed to about 50–70° C., whereupon 13.50 cc. (0.2 mol) of a 45% aqueous methylamine solution and 35 cc. warm water were stirred into it. The resulting alkaline mixture was allowed to stand for three hours at 50–70° C. and overnight at room temperature. Thereafter, the alkaline solution was admixed with 100 cc. water, whereby a precipitate was formed, which was separated by vacuum filtration and washed with water. The precipitate was then dissolved in 50 cc. methanol, water was added to the solution until it became turbid, and the precipitate was recrystallized from this solution. The yield was 24 gm. (84% of theory) of a substance having a melting point of 126–127° C. This substance was dissolved in 15 cc. benzene, and petroleum ether and gasoline were added to the solution until it became turbid. The reaction product recrystallized thereby from the benzene solution, yielding 23 gm. (80.5% of theory) of a substance having a melting point of 126–128° C. and an optical rotation value $[\alpha]_D^{21.5} = -232°$ in benzene. It was identified to be levo-1,1-diphenyl-propane-1,2-diol-2-(N-methyl)-carbamate of the formula

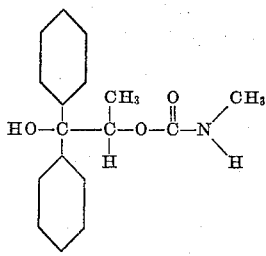

The following compounds were produced in analogous fashion:

(b) Levo-1,1-diphenylpropane-1,2-diol-2-(N-ethyl)-carbamate, having a melting point of 98–100° C.

(c) Levo - 1,1-diphenylpropane-1,2-diol-2-(N-propyl)-carbamate, having a melting point of 122–123° C.

(d) Levo - 1,1-diphenylpropane-1,2-diol-2-(N-butyl)-carbamate, having a melting point of 88–90° C. In order to increase the alkalinity of the reaction mixture, four times the amount of an aqueous butylamine solution was used in place of the methylamine solution in the process described under (a) above.

(e) Levo-1,1-diphenylpropane-1,2-diol-2-(N,N-dimethyl)-carbamate, having a melting point of 175–177° C. Dimethylamine was used in place of methylamine in the process described under (a) above.

(f) Levo-1,1-diphenylpropane-1,2-diol-2(N,N-diethyl)-carbamate, having a melting point of 126–127° C.

(g) Levo-1,1-diphenylpropane-1,2-diol-piperidyl-N-carboxylate, having a melting point of 167–169° C. and the formula

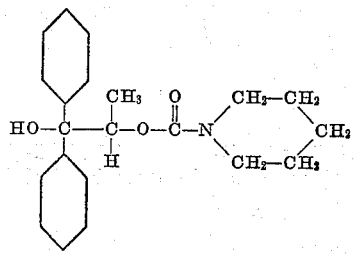

The aqueous ethanol solution of the cyclic levo-1,1-diphenylpropane-1,2-diol-carbonate and piperidine was refluxed, so that the reaction proceeded more rapidly than with acyclic amines. The volatility of the latter prohibits heating of the reaction mixture to the boiling point.

(h) Levo - 1,1-diphenylpropane-1,2-diol-morpholyl-N-carboxylate, having a melting point of 176–178° C. and the formula

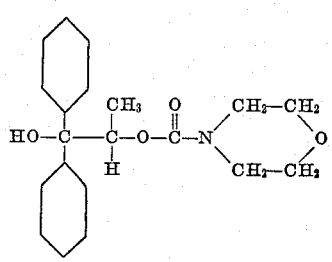

This compound was very rapidly obtained by boiling the reaction solution under reflux.

All of the carbamates (b) to (h) may be readily recrystallized from aqueous ethanol.

(i) Levo - 1,1-diethylpropane-1,2-diol-carbamate (liquid).

(j) Levo - 1,1-diethylpropane-1,2-diol-(N-methyl)-carbamate (liquid).

(k) Levo-1,1-diethylpropane-1,2-diol-(N,N-dimethyl)-carbamate. This compound had a low melting point and was therefore very difficult to purify.

(l) Levo-1,1-dipropylpropane-1,2-diol-carbamate (liquid).

(m) Levo - 1,1-dipropylpropane-1,2-diol-(N-methyl)-carbamate (liquid).

(n) Levo - 1,1-dipropylpropane-1,2-diol-(N,N-dimethyl)-carbamate (liquid).

(o) Levo - 1,1-dibutylpropane-1,2-diol-carbamate (liquid).

(p) Levo-1,1-dibutylpropane-1,2-diol-(N-methyl)-carbamate (liquid).

(q) Levo-1,1-dibutylpropane-1,2-diol-(N,N-dimethyl)-carbamate. This compound had a low melting point and was therefore difficult to purify.

(r) Levo - 1,1-di-(2-methylallyl)-propane-1,2-diol-(N-methyl)-carbamate (liquid), having the structural formula

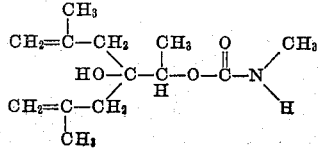

(s) Levo-1,1-di-(2-methylallyl)-propane-1,2-diol-(N,N-dimethyl)-carbamate (liquid).

(t) Levo-1,1-di-(o-anisyl)-propane-1,2-diol-2-(N-methyl)-carbamate, having a melting point of 178.5–180.5° C. and the structural formula

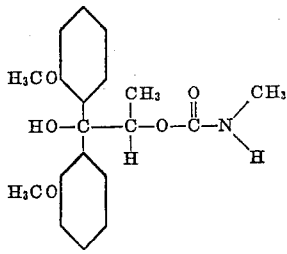

(u) Levo-1,1-di-(p-tolyl)-propane-1,2-diol-2-(N-methyl)-carbamate. This is a non-distillable liquid of the formula

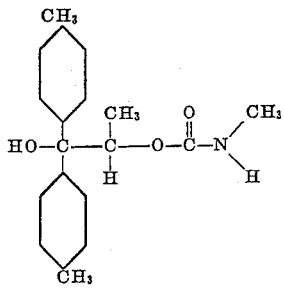

(v) Levo - 1,1 - dibenzylpropane-1,2-diol-2-carbamate. This is a non-distillable liquid.

(w) 1,1 - diphenylbutane - 1,2-diol-2-(N-methyl)-carbamate, having a melting point of 136–139° C. and the structural formula

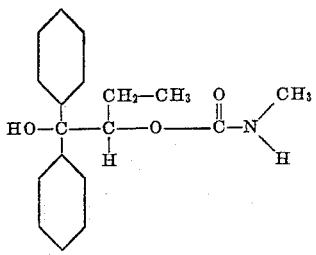

(x) 1-ethyl-1-phenylbutane-1,2-diol-2-(N-methyl)-carbamate, having a melting point of 106–108° C.

(y) Levo - 1 - methyl-1-phenyl-propane-1,2-diol-2-(N-methyl)-carbamate, having a melting point of 110–112.5° C.

(z) Levo-1-ethyl-1-phenyl-propane-1,2-diol-2-(N-methyl)-carbamate, having a melting point of 82–85° C.

(aa) Levo - 1 - propyl-1-phenyl-propane-1,2-diol-2-(N-methyl)-carbamate, having a melting point of 110–113° C.

(bb) Levo - 1 - butyl-1-phenyl-propane-1,2-diol-2-carbamate, having a melting point of 102–105° C.

(cc) Levo - 1-butyl - 1-phenyl-propane-1,2-diol-2-(N-methyl)-carbamate. Melting point 87–90° C.

(dd) Levo - 1-methyl-1-propyl-propane-1,2-diol-2-carbamate, having a melting point of 102–105° C.

(ee) Levo - 1-methyl-1-propyl-propane-1,2-diol-2-(N-methyl)-carbamate, having a boiling point of 90–91° C. at 0.05 mm. Hg.

(ff) Levo - 1 - ethyl-1-propyl-propane-1,2-diol-2-carbamate, having a boiling point of 98–102° C. at 0.05 mm. Hg.

(gg) Levo - 1 - ethyl-1-propyl-propane-1,2-diol-2-(N-methyl)-carbamate, having a boiling point of 96.5–98° C. at 0.02 mm. Hg.

(hh) Levo - 1 - ethyl-1-propyl-propane-1,2-diol-2-(N-ethyl)-carbamate, having a boiling point of 108–109.5° C. at 0.07 mm. Hg.

EXAMPLE XII

LEVO-1,1-DIPHENYL-1-CHLOROPROPANE-2-OL-2-CARBAMATE

A solution of 27 gm. (0.1 mol) levo-1,1-diphenyl-propane-1,2-diol-2-carbamate in 150 cc. benzene was admixed with 24 gm. (0.2 mol) thionylchloride, and the resulting mixture was refluxed for 2½ hours. Thereafter, the benzene solvent was distilled off in vacuo and the residue was recrystallized from ligroin. The product had a melting point of 129–132° C. and the structural formula

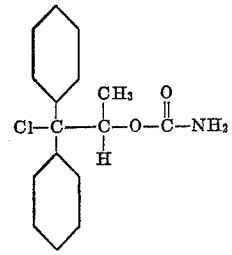

EXAMPLE XIII

LEVO-1,1-DIPHENYL-1-CHLOROPROPANE-2-OL-2-ALLOPHANATE 31.4 gm. (0.1 mol) levo-1,1-diphenylpropane-1,2-diol-2-allophanate were dissolved in a mixture consisting of 200 cc. benzene and 100 cc. toluene. 36 gm. (0.3 mol) thionylchloride were added to the resulting solution, and the reaction mixture was refluxed for 4½ hours. Thereafter, the solvent was evaporated in vacuo, and the residue was recrystallized twice, once from a mixture of benzene and petroleum ether and once from benzene. The yield was 7.3 gm. of a substance having a melting point of 163–165° C. and the structural formula

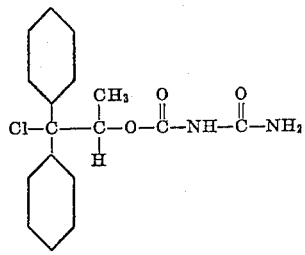

All of the preceding examples describe the preparation of optically active compounds which are derived from levo-glycols, which in turn are derived from levo-lactic acid. It is self-evident that the corresponding racemic compounds may be prepared in accordance with the same procedures using glycols produced from racemic lactic acid. The melting points of the racemic carbamic acid glycol esters thus obtained are in all instances lower than those of the optical antipode. The preparation of a racemic glycol-carbamate is illustrated in the following example:

EXAMPLE XIV

DEXTRO, LEVO-1,1-DIPHENYLPROPANE-1,2-DIOL-2-(N-METHYL)-CARBAMATE 12.7 gm. (0.05 mol) dextro, levo-1,1-diphenylpropane-1,2-diol-carbonate were dissolved in 40 cc. methanol, and the resulting solution was warmed to about 40° C. Thereafter, 10 cc. (about 0.15 mol) of a 45% aqueous methylamine solution and 10 cc. water were stirred into the warm solution, and the resulting mixture was allowed to stand for 15 hours at room temperature. The reaction product was separated out by adding 75 cc. water and the reaction mixture was stirred until the partly oily precipitate solidified. The precipitate was then filtered off on a vacuum filter, washed with water and recrystallized from aqueous methanol (30 cc. aqueous methanol were added to the solution until turbidity set in). The yield was 19.2 gm. of a substance having a melting point of 115–118° C. The substance was identified as dextro, levo - 1,1 - diphenylpropane - 1,2 - diol - 2 - (N - methyl)-carbamate of the formula

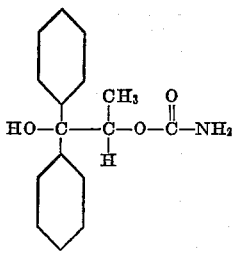

While we have illustrated the present invention with the aid of various specific embodiments, it will be apparent to those skilled in the art that the invention is not limited to these particular embodiments, and that various changes and modifications can be made without departing from the spirit of the invention or the scope of the appended claims.

We claim:
1. The levo-enantiomorphs, substantially free from their optical antipodes, of carbamic acid esters having the structural formula

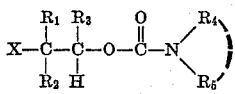

wherein:
X is selected from the group consisting of hydroxyl, chlorine and bromine,
$R_1$ and $R_2$ are selected from the group consisting of lower alkyl, lower alkenyl, phenyl, lower alkyl-substituted phenyl, lower alkoxy-substituted phenyl, cyclohexyl and benzyl,
$R_3$ is lower alkyl
$R_4$ is selected from the group consisting of hydrogen, lower alkyl and carbamyl,
$R_5$ is selected from the group consisting of hydrogen and lower alkyl, and
$R_4$ and $R_5$, together with each other and the adjacent nitrogen atom, form a heterocyclic radical selected from the group consisting of piperidyl and morpholyl.

2. Levo - 1,1 - diphenylpropane - 1,2 - diol - 2 - (N - methyl)-carbamate.
3. Levo - 1,1 - diphenylpropane - 1,2 - diol - 2 - (N - ethyl)-carbamate.
4. Levo - 1,1 - diphenylpropane - 1,2 - diol - 2 - (N - propyl)-carbamate.
5. Levo - 1,1 - diphenylpropane - 1,2 - diol - 2 - allophanate.
6. Levo - 1,1 - diphenyl - 1 - chloro - propane - 2 - ol-2-allophanate.
7. Levo - 1,1 - diethylpropane - 1,2 - diol - 2 - (N - methyl)-carbamate.
8. Levo - 1,1 - di - n - propylpropane - 1,2 - diol - 2-(N-methyl)-carbamate.
9. Levo - 1 - methyl - 1 - phenyl - propane - 1,2 - diol-2-(N-methyl)-carbamate.
10. Levo - 1 - ethyl - 1 - phenyl - propane - 1,2 - diol-2-(N-methyl)-carbamate.
11. Levo - 1 - n - propyl - 1 - phenyl - propane - 1,2-diol-2-(N-methyl)-carbamate.
12. Levo - 1 - butyl - 1 - phenyl - propane - 1,2 - diol-2-carbamate.
13. Levo - 1 - butyl - 1 - phenyl - propane - 1,2 - diol-2-(N-methyl)-carbamate.
14. Levo - 1 - methyl - 1 - n - propyl - propane - 1,2-diol-2-(N-methyl)-carbamate.
15. Levo - 1 - ethyl - 1 - n - propyl - propane - 1,2 - diol-2-carbamate.
16. Levo - 1 - ethyl - 1 - n - propyl - propane - 1,2 - diol-2-(N-ethyl)-carbamate.
17. Levo - 1 - ethyl - 1 - phenyl - butane - 1,2 - diol - 2-(N-methyl)-carbamate.

References Cited in the file of this patent
UNITED STATES PATENTS

| | | |
|---|---|---|
| 2,627,524 | Malkamus | Feb. 3, 1953 |
| 2,802,022 | Grozos et al. | Aug. 6, 1957 |
| 2,860,166 | Newcomer et al. | Nov. 11, 1958 |

OTHER REFERENCES

Blohm: Chem. Rev., vol. 51, page 495 (1952).
Najer: Bull. Chem. Soc. (France), 1954, pages 1142–8.